US012263503B2

(12) United States Patent
Mittag et al.

(10) Patent No.: US 12,263,503 B2
(45) Date of Patent: Apr. 1, 2025

(54) METERING VALVE

(71) Applicant: Atlas Copco IAS GmbH, Bretten (DE)

(72) Inventors: Sten Mittag, Karlsruhe (DE); Bernhard Sauer, Oelbronn-Duerrn (DE)

(73) Assignee: Atlas Copco IAS GmbH, Bretten (DE)

( * ) Notice: Subject to any disclaimer, the term of this patent is extended or adjusted under 35 U.S.C. 154(b) by 919 days.

(21) Appl. No.: 17/047,726

(22) PCT Filed: Jan. 18, 2019

(86) PCT No.: PCT/EP2019/051226
§ 371 (c)(1),
(2) Date: Oct. 15, 2020

(87) PCT Pub. No.: WO2019/201483
PCT Pub. Date: Oct. 24, 2019

(65) Prior Publication Data

US 2021/0146397 A1 May 20, 2021

(30) Foreign Application Priority Data

Apr. 16, 2018 (DE) ..................... 10 2018 108 915.5

(51) Int. Cl.
*B05C 5/02* (2006.01)
*B05C 11/10* (2006.01)

(52) U.S. Cl.
CPC .......... *B05C 5/0225* (2013.01); *B05C 5/0275* (2013.01); *B05C 5/0279* (2013.01); (Continued)

(58) Field of Classification Search
CPC ... B05C 5/0225; B05C 5/0275; B05C 5/0279; B05C 11/1028; B05C 5/02; B05C 11/10
See application file for complete search history.

(56) References Cited

U.S. PATENT DOCUMENTS 1,146,276 A * 7/1915 Poindexter ................ F16T 1/10 137/196
5,743,457 A 4/1998 Benedette et al.
(Continued)

FOREIGN PATENT DOCUMENTS

CN 101711186 A 5/2010
CN 201450139 U 5/2010
(Continued)

OTHER PUBLICATIONS

English translation of the International Preliminary Report on Patentability of the International Searching Authority in PCT/EP2019/051226, dated Oct. 22, 2020.
(Continued)

*Primary Examiner* — Craig M Schneider
*Assistant Examiner* — Christopher D Ballman
(74) *Attorney, Agent, or Firm* — Collard & Roe, P.C.

(57) ABSTRACT

A metering valve for viscous materials has a housing, a material channel extending in the housing and opening into material outlet openings, and a number of valve pins, which are movably mounted in the housing, the number corresponding to the number of material outlet openings, wherein a valve seat is associated with each valve pin and each valve pin is movable between a closed position, in which it sits on the valve seat associated with it and closes one of the material outlet openings, and an open position, in which the material outlet opening concerned is exposed. The valve pins are produced from carbide and are guided in a longitudinally displaceable manner through feed-through openings in a guide block arranged at a distance from the valve seats, wherein the guide block is produced from carbide, at least on the inner surfaces of the feed-through openings facing the valve pins.

19 Claims, 4 Drawing Sheets

Figure 1:
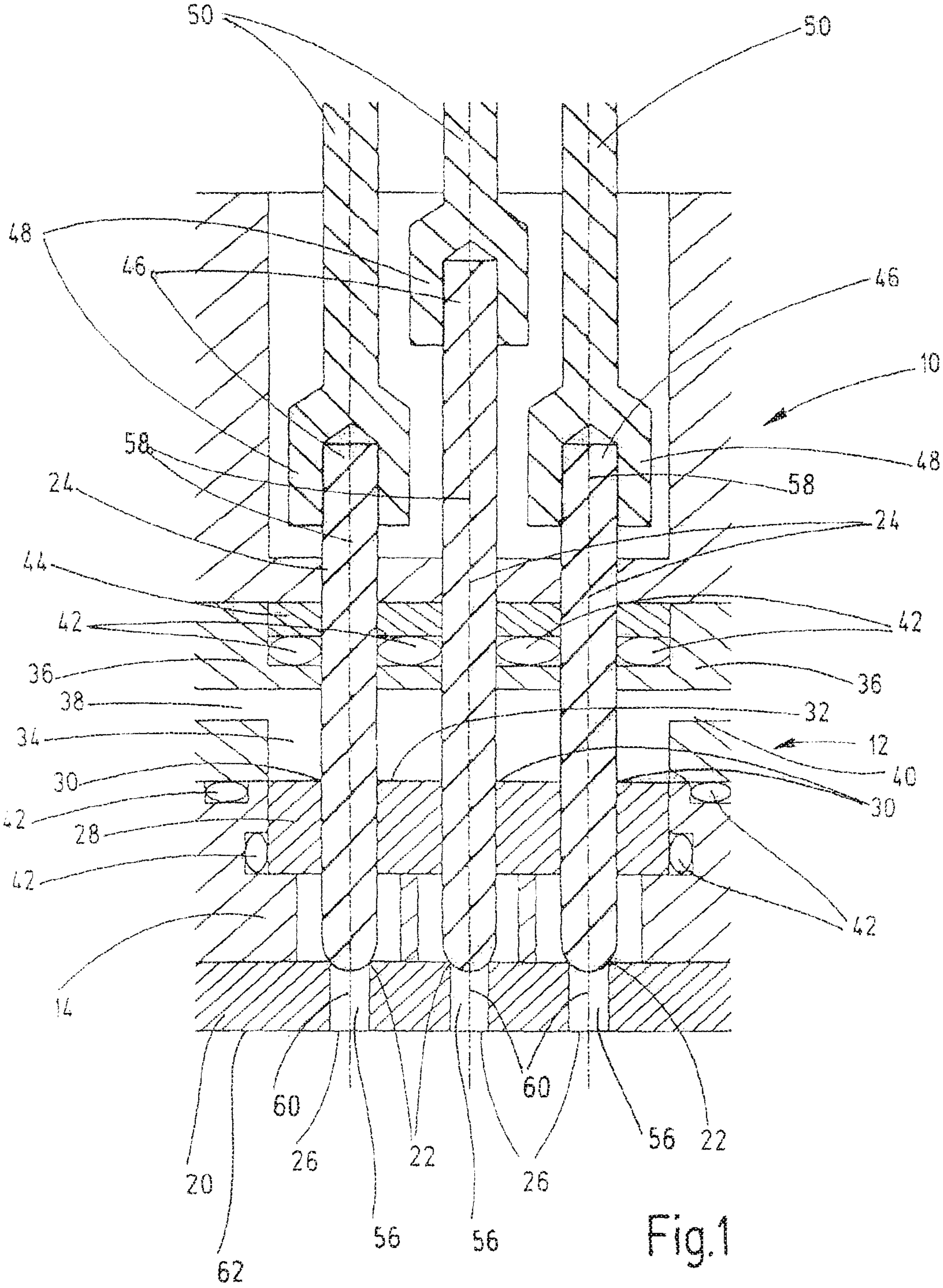

(52) U.S. Cl.
CPC ................. *B05C 5/02* (2013.01); *B05C 11/10* (2013.01); *B05C 11/1028* (2013.01)

(56) References Cited

U.S. PATENT DOCUMENTS

| | | | | |
|---|---|---|---|---|
| 5,747,102 | A * | 5/1998 | Smith | G01F 13/006 228/102 |
| 5,873,528 | A * | 2/1999 | Lewis | B05C 5/0225 239/584 |
| 5,875,922 | A * | 3/1999 | Chastine | B05C 5/0225 335/219 |
| 6,161,722 | A * | 12/2000 | Sooudi | F16K 31/086 222/1 |
| 6,210,141 | B1 * | 4/2001 | Allen | B05C 5/0279 425/188 |
| 6,253,957 | B1 * | 7/2001 | Messerly | B05C 5/0225 222/61 |
| 6,799,702 | B1 | 10/2004 | Mercer et al. | |
| 6,817,549 | B2 | 11/2004 | Dankert | |
| 6,935,578 | B1 * | 8/2005 | Shibata | F02M 61/188 239/593 |
| 7,837,071 | B2 | 11/2010 | Achrainer | |
| 8,893,930 | B2 * | 11/2014 | Tix | B05B 15/40 210/429 |
| 9,314,812 | B2 * | 4/2016 | Clark | B23K 3/0623 |
| 9,463,479 | B2 | 10/2016 | Park et al. | |
| 10,675,677 | B2 | 6/2020 | Brexeler | |
| 2003/0080219 | A1 * | 5/2003 | Dankert | F16K 1/38 239/DIG. 19 |
| 2013/0175369 | A1 * | 7/2013 | Park | B05B 1/3046 239/583 |
| 2021/0215522 | A1 * | 7/2021 | Salzgeber | F16K 11/07 |

FOREIGN PATENT DOCUMENTS

| | | | |
|---|---|---|---|
| CN | 103369826 | A | 10/2013 |
| CN | 107206478 | A | 9/2017 |
| DE | 40 13 322 | A1 | 10/1991 |
| DE | 37 88 729 | T2 | 7/1994 |
| DE | 195 03 544 | A1 | 8/1996 |
| DE | 295 08 916 | U1 | 10/1996 |
| DE | 101 53 142 | A1 | 5/2003 |
| DE | 102 56 044 | A1 | 6/2004 |
| DE | 10 2012 112 915 | A1 | 7/2013 |
| DE | 10 2016 010 375 | A1 | 3/2018 |
| EP | 0 894 036 | A1 | 2/1999 |
| JP | 2002-361151 | A | 12/2002 |
| WO | 88/03059 | A1 | 5/1988 |
| WO | 97/36710 | A1 | 10/1997 |

OTHER PUBLICATIONS

Chinese Office Action in 201980026387.9, dated Oct. 27, 2021, with English translation.

International Search Report in PCT/EP2019/051226, mailed Jul. 31, 2019.

German Search Report in DE 10 2018 108 915.5, dated Dec. 20, 2018, with English translation of relevant parts.

* cited by examiner

METERING VALVE

CROSS REFERENCE TO RELATED APPLICATIONS

This application is the National Stage of PCT/EP2019/051226 filed on Jan. 18, 2019, which claims priority under 35 U.S.C. § 119 of German Application No. 10 2018 108 915.5 filed on Apr. 16, 2018, the disclosure of which is incorporated by reference. The international application under PCT article 21(2) was not published in English.

The invention relates to a metering valve for viscous materials, in accordance with the preamble of claim 1.

Such metering valves, configured as needle valves, are known and are used, for example in the automotive industry, to apply adhesives, sealants, insulation material or heat-conducting pastes to car body parts. They are characterized in that they can be precisely controlled by means of suitable actuators, and can be opened and closed again within a short period of time, so that even small amounts of the viscous material can be reliably applied to the workpieces. If multiple material outlet openings and valve needles belonging to them are arranged in a row, so as to allow simultaneous application of multiple material beads that run parallel to one another, then the material outlet openings cannot be arranged in just any desired manner, close to one another. The distance of the material outlet openings from one another is limited, in a downward direction, by the diameter of the valve needles and by a minimum distance of the valve needles from one another, wherein the latter results from the necessity of precise guidance of the valve needles and a seal that prevents exiting of the viscous material between the valve needles and the housing.

It is therefore the task of the invention to further develop a metering valve of the type stated initially, in such a manner that using the valve, it is possible to apply material beads or dots having a smaller diameter and/or having a smaller reciprocal distance.

This task is accomplished, according to the invention, by means of a metering valve having the characteristics of claim 1 and, alternatively, by means of a metering valve having the characteristics of claim 12. Advantageous further developments of the invention are the object of the dependent claims.

The solution according to the invention, according to claim 1, is based on the idea of achieving sufficiently stable, precise and well-sealed guidance of the valve needles by means of a configuration of the valve needles and of guidance of the valve needles, made of carbide, so that the needles can be kept small and can be arranged at small distances from one another. Then placement of the material outlet openings at small distances from one another also results from placement of the valve needles at small distances from one another, along with the possibility of equipping the material outlet openings with a small cross-section. In particular if the inner surfaces of the feed-through openings lie against the valve needles, forming a seal, the necessity of providing further sealing elements is eliminated, and the valve needles can be arranged at a small reciprocal distance from one another. For this purpose, the guide block is adapted to the valve needle or the valve needles with great precision, and it is/they are accommodated in it almost without play. This measure furthermore brings about very precise guidance of the valve needle or of the valve needles.

The invention according to claim 12 is based on the idea that components composed of carbide are more resistant to wear. It is therefore advantageous to form the valve needle or the valve needles from carbide, since carbide is chemically resistant, in particular, to the materials, for the application of which the metering valve is used. If the valve needles are produced from carbide, then the related valve seats cannot be produced from softer material, since otherwise they would be deformed by the valve needles. These two aspects of the invention can be advantageously combined with one another, wherein it is practical if the valve seats are arranged on a valve seat block.

In this regard, a carbide should be understood to be a metal matrix composite material, in which hard substances present in particle form are held together by a matrix composed of metal. Metal carbides or metal nitrides, in particular, are used as hard substances, such as, for example, tungsten carbide, titanium carbide, titanium nitride, niobium carbide, tantalum carbide or vanadium carbide. Ideally, the two aspects of the invention defined by claims 1 and 12 are combined with one another, wherein it is practical if the valve seat block and/or the guide block is/are produced in one piece from carbide and preferably from the same carbide as the one from which the valve needles are produced, and this simplifies production.

It is practical if the housing has an in-feed part through which the material channel runs from a material inlet opening all the way to the valve seat block. The in-feed part is preferably produced from stainless steel or from aluminum and, in particular, in one piece. Stainless steel and aluminum are less expensive and less brittle, as well as easier to process than carbide. In this regard, it is practical if the guide block is accommodated in the in-feed part and preferably connected with it in releasable manner. In order to further prevent undesired exiting of viscous material, it is practical if a flushing chamber for accommodation of a fluid is arranged on the rear of the guide block, facing away from the valve seat block. This fluid can have plasticizer properties that prevent particles of the viscous material that pass through the guide block from hardening there, turning resinous or caking on. In particular, a fluid that is distributed under the trade name Mesamoll or Mesamoll II can be used as the fluid. It is practical if the fluid is passed through the flushing chamber by way of a feed line and a drain line in the housing, so that this chamber is constantly flushed with the fluid. In this regard, it is preferred that the housing has a closure part connected with the in-feed part, preferably produced from stainless steel or aluminum, having or covering the flushing chamber, which part furthermore has the feed line and the drain line at least in certain sections, in practical manner.

It is practical if the housing is configured in multiple parts, with multiple housing parts, at least two of which are releasably connected with one another. In this regard, one of the housing parts releasably connected with one another is the guide block and/or the valve seat block and/or the in-feed part and/or the closure part. If one of the housing parts releasably connected with the other housing parts has been worn down, then it can be replaced in simple manner, without the entire metering valve having to be replaced. It is advantageous if this relates to the housing parts composed of carbide.

It is preferred that multiple material outlet openings and multiple valve needles are arranged, in each instance, in one row or in multiple rows, preferably running parallel to one another. When using carbide as the material, the valve needles can have a small diameter, so that valve seats and the material outlet openings can be structured to be correspondingly small. Thus the metering valve can have multiple small material outlet openings, arranged at a small distance from one another, by way of which small material amounts in the form of thin material beads or in the form of small material dots can be applied to the workpieces with great precision.

In order to be able to precisely control the valve needle or the valve needles, preferably an actuator unit having at least one actuator, preferably at least one piezo-actuator is provided. In this regard, connecting a valve needle composed of carbide with an activation element composed of a different material and activated by an actuator is not trivial. It is advantageous if it is provided that each valve needle is accommodated, with its end facing away from the corresponding valve seat, in a sleeve composed of metal, preferably of stainless steel, and connected with this sleeve. It is practical if the connection is produced by means of soldering. In this regard, it is advantageous if sleeves connected with valve needles that are adjacent to one another are arranged at different distances from the corresponding valve seat. In this way, the fact is taken into account that the sleeves, by their nature, have a greater diameter than the valve needles, but are not allowed to collide during operation. Each of the sleeves can then be actuated by the actuator unit, wherein it is practical if a solid-body joint is arranged between every sleeve and the actuator unit. This joint can then be connected with the sleeve by means of laser welding, in particular. It is practical if an actuator is assigned to every valve needle for its actuation.

It is also possible that each valve needle has a force applied to it, by means of at least one elastic reset element mounted in the housing, in a direction away from the corresponding valve seat, counter to which force the actuator unit applies a closing force. Here, too, application of the force preferably takes place by way of a solid-body joint, which does not, however, have to be rigidly connected with the valve needle in question, but rather can lie loosely on it, so as to press it onto the valve seat. The at least one reset element preferably engages with a step of the valve needles, wherein the steps of valve needles adjacent to one another can be arranged at equal distances from the corresponding valve seat, but it is practical if they are arranged at different distances from the corresponding valve seat. The steps bring about a thickening of the valve needles, which then would hinder placement of the valve needles at small distances from one another if they were all arranged at an equal distance from the related valve seats.

According to an advantageous further development, a material outflow channel that communicates with the material channel is arranged in the housing and runs to a material outflow opening. When the metering valve is closed, material through-flow can then take place, so that the material channel is constantly flushed with material. Furthermore, it is possible that a Peltier element for tempering the viscous material is arranged on or in the housing, in particular on or in the in-feed part. The Peltier element can heat and cool the viscous material, and can be inserted into a recess on the edge of the housing or set onto the housing, for example.

According to an alternative embodiment, a material outlet channel extends between each of the valve seats and the related material outlet opening, the center axis of which channel is angled away at an acute angle with reference to the longitudinal axis of the related valve needle, along which axis the needle can be moved between the closed position and the open position. It is practical if the acute angle amounts to between 10° and 40° and preferably approximately 20°. In this regard, it is preferred that the center axes of all the material outlet channels run parallel to one another. Furthermore, it is preferred that the center axes of all the material outlet channels run transverse to a plane spanned by the longitudinal axes of the valve needles. By means of this measure, it is possible to apply material even in corners or edges of a workpiece, for example, above which the material outlet openings cannot be placed directly or can be placed only at an overly great distance, for structural reasons. This is particularly advantageous if the metering valve has a large construction and therefore the material outlet openings cannot be moved close enough to a side wall that delimits the edge of the workpiece due to the dimensions of the metering valve. It is advantageous if the material outlet openings are arranged in a material outlet surface, in this regard, and the center axes of the material outlet channels run perpendicular to the material outlet surface. This facilitates material exiting in the direction of the center axes of the material outlet channels, so that droplets of the viscous material can be applied, in targeted manner, in a corner or on an edge of the workpiece, in particular "shot" there under pressure. When applying the viscous material onto a workpiece, the metering valve is moved at a distance from and parallel to the workpiece surface, specifically preferably in the direction in which the center axis/axes of the material outlet channel or the material outlet channels is/are angled away relative to the longitudinal axis of the corresponding related valve needle.

Figure 3:
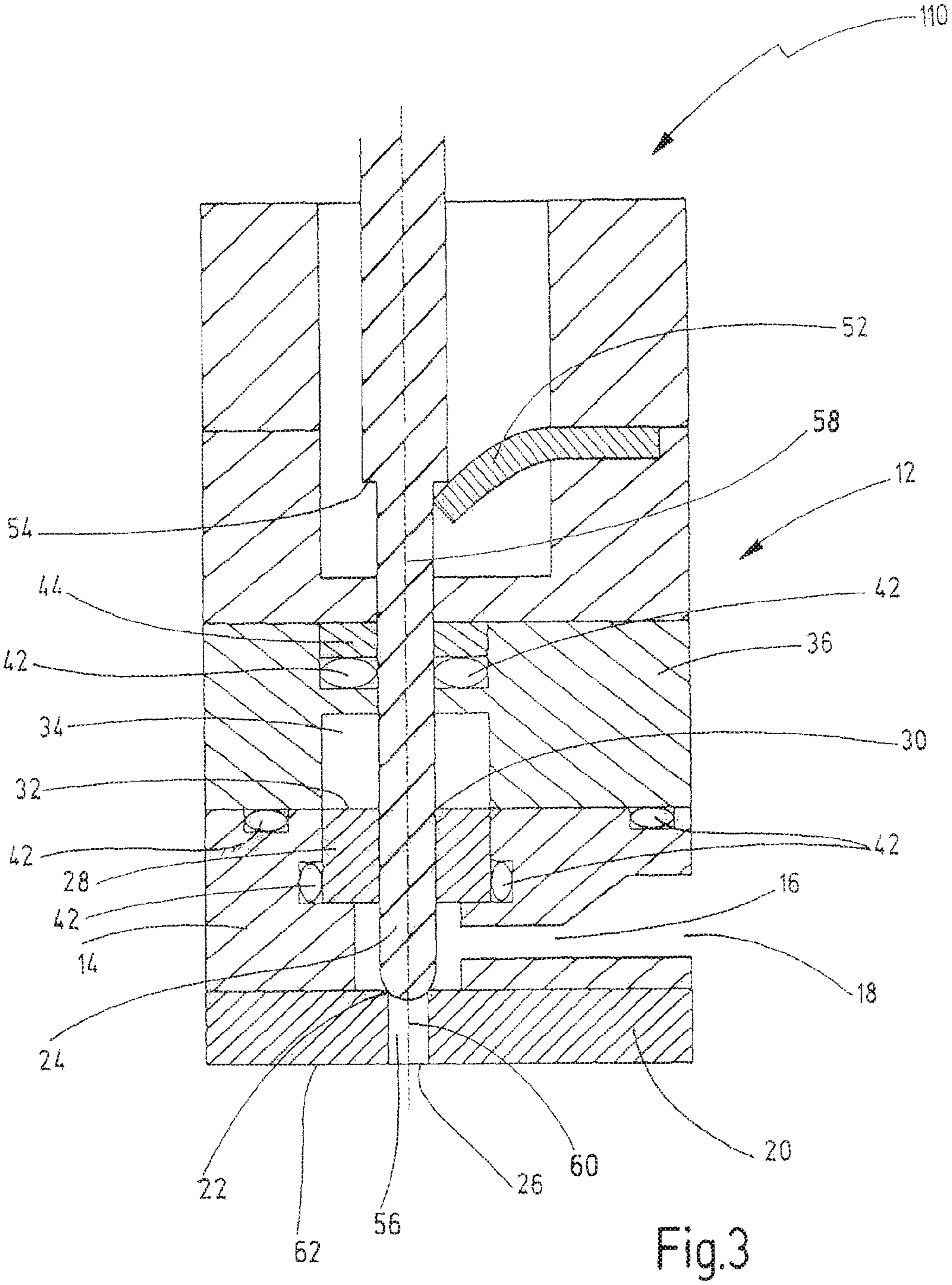
Figure 4:
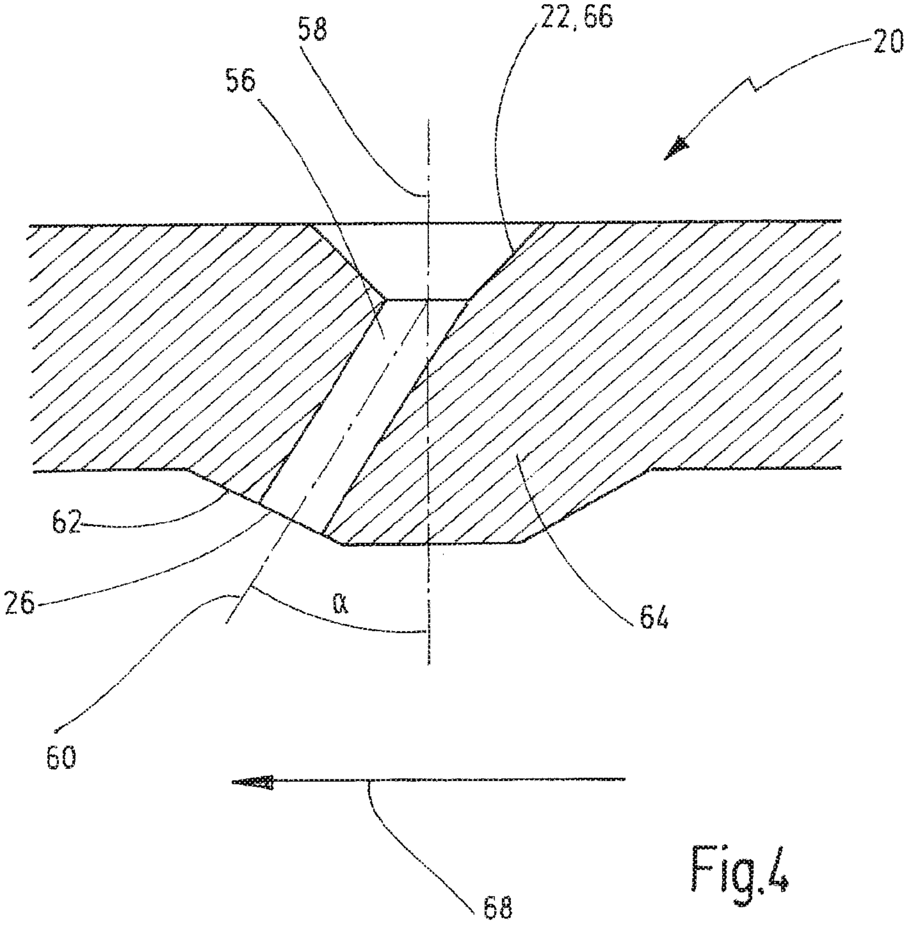

In the following, the invention will be explained in greater detail using two exemplary embodiments shown schematically in the drawing. The figures show:

FIG. 1, 2 a metering valve in section, in a front view and a side view, in accordance with a first exemplary embodiment;

FIG. 3 a metering valve in section, in a side view, according to a second exemplary embodiment, and FIG. 4 an alternative embodiment of a valve seat block in cross-section.

The metering valve 10 shown in the drawing, according to a first exemplary embodiment, has a housing 12 that has multiple parts that are releasably connected with one another. A material channel 16 runs through an in-feed part 14 produced from stainless steel, from a material inlet opening 18, by way of which a viscous material such as adhesive, sealant, insulation material or heat-conducting paste can be introduced into the material channel 16. A valve seat block 20 is mounted on the in-feed part 14, which block is produced in one piece from carbide. Here, as an example, the valve seat block 20 has three valve seats 22 arranged in a row, each of which has a valve needle 24 assigned to it, which needle is arranged to be linearly displaceable along its longitudinal axis 58 in the housing 12. Ahead of the valve seats 22, the material channel 16 is split into three partial channels, each of which ends at a material outlet opening 26 in a material outlet surface 62 of the valve block 20. However, splitting of the material channel 16 into partial channels is not compulsory. For example, the material channel 16 can also end in a material chamber from which the material can then exit through the material outlet openings 26 when the valve needles 24 are raised from the valve seats 22. To expose and close the material outlet openings 26, the valve needles 24 can be raised off or set onto the corresponding related valve seat 22. A material outlet channel 56 extends between each of the valve seats 22 and the corresponding related material outlet opening 26, the center axis 60 of which channel coincides with the longitudinal axis 58 of the related valve needle 24. The metering valve 10 is generally moved perpendicular to the longitudinal expanse of the row of the material outlet openings 26 with reference to a workpiece in order to apply the material.

The valve needles 24 are guided in a guide block 28 that is received in the in-feed part 14 and releasably connected with the former, in that they are passed through feed-through openings 30 that extend through the guide block 28. In this regard, the feed-through openings 30 are precisely adapted, in terms of their dimensions, to the dimensions of the valve needles 24, so that the latter are guided very precisely in the guide block 28 and furthermore a sealing effect is achieved between the guide block 28 and the valve needles 24, which prevents exiting of the viscous material in a direction away from the material outlet openings 26. The guide block 28, just like the valve needles 24, is produced from the same carbide as the valve seat block 20.

A flushing chamber 34 is situated in the housing 12, adjacent to a rear side 32 of the guide block 28 that faces away from the material outlet openings 26. This chamber is situated in a closure part 36, which is produced from stainless steel and releasably connected with the in-feed part 14; a feed line 38 that opens into the flushing chamber 34 and a drain line 40 that also communicates with the flushing chamber 34 run through the closure part. During operation of the metering valve 10, the flushing chamber 34 is constantly flushed with a fluid, for example with Mesamoll or Mesamoll II, which fluid is introduced into the flushing chamber 34 by way of the feed line 38 and conducted away from the flushing chamber 34 by way of the drain line 40. In this manner, viscous material that penetrates through the feed-through openings 30 in spite of the sealing effect between the guide block 28 and the valve needles 24 is removed from the flushing chamber 34. A seal that prevents exiting of fluid out of the flushing chamber 34 is provided by means of sealing rings 42 that are arranged between the in-feed part 14 and the guide block 28, between the in-feed part 14 and the closure part 36, as well as between the closure part 36 and a guide element 44 arranged in the closure part 36, through which element the valve needles 24 run.

The ends 46 of the valve needles 24 that face away from the valve seats 22 are accommodated, in the case of the first exemplary embodiment, in a sleeve 48 composed of stainless steel, in each instance, to which they are firmly soldered. The sleeves 48, which are connected with valve needles 24 that are adjacent to one another, are situated at different heights, so that the valve needles 24 can be arranged at small distances from one another. An extension 50 connected with each sleeve 48, in one piece, extends in a direction away from the valve seats 22 and is impacted by a piezo-actuator, not shown in the drawing, in each instance, by way of a solid-body joint, so as to move the corresponding valve needle 24 to expose the corresponding material outlet opening 26 and close it again. In this regard, the valve needles 24 can be moved individually, independently of the other valve needles 24, in each instance.

The metering valve 110 according to the second exemplary embodiment (FIG. 3) differs from the metering valve 10 according to the first exemplary embodiment (FIG. 1, 2) only in the way the valve needles 24 are impacted for opening and closing, so that features having the same effect are provided with the same reference symbols. A spring 52 is arranged in the housing 12, which has multiple arms connected with one another in one piece, one of which, in each instance, engages onto a step 54 of each of the valve needles 24, at which the valve need in question becomes thicker. The reset force of the spring 52 acts in the direction away from the corresponding valve seat 22. The piezo-actuator, which impacts the valve needle 24 by way of a solid-body joint, closes the material outlet opening 26 in that it presses the valve needle 24 onto the valve seat 22, counter to the spring force. The solid-body joint then lies only loosely on the end of the valve needle 24 that faces away from the valve seat 22 and is not shown in FIG. 3. The steps 54 of adjacent valve needles 24 are also situated at different heights above the valve seats 22, so that the valve needles 24 can be arranged at small distances from one another.

Figure 2:
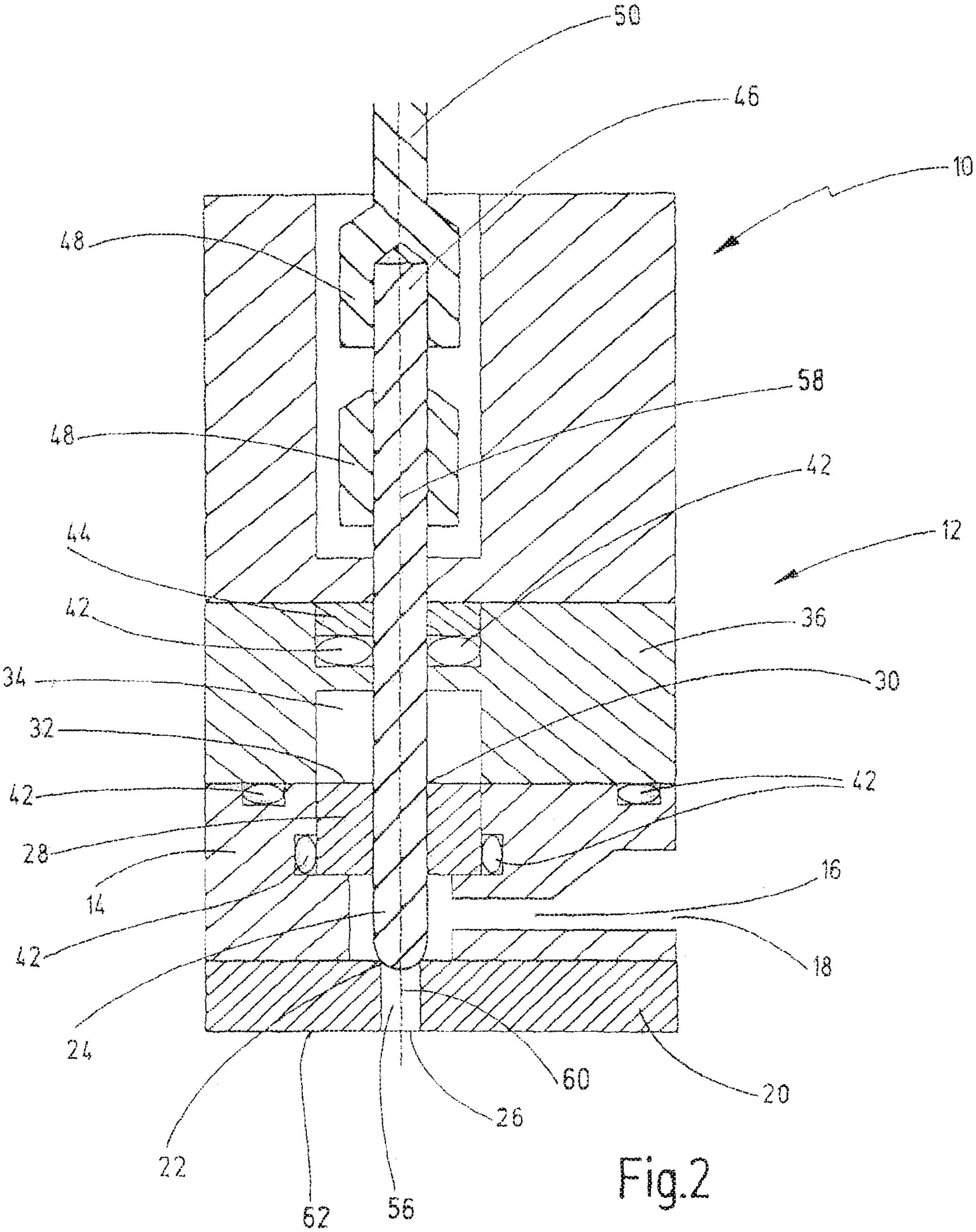

FIG. 4 shows an alternative embodiment of the valve seat block 20, which can be used in place of the valve seat blocks 20 shown in FIG. 1 to FIG. 3, in the case of the metering valves 10, 110 shown there. The alternative valve seat block 20 is characterized in that material outlet channels 56 that run from the valve seats 22 to the related material outlet opening 26, in each instance, do not run perpendicularly downward, but rather are angled away, in each instance, relative to the longitudinal axis 58 of the related valve needle 24. Each of the material outlet channels 56 has a center axis 60 that is angled away by an angle $\alpha$ of approximately 20° with reference to the longitudinal axis 58 of the related valve needle 24. In this regard, all the material outlet channels 56 are angled away in the same direction, so that their center axes 60 run parallel to one another. Furthermore, the center axes 60 run transverse to a plane spanned through the longitudinal axes 58 of the valve needles 24, and enclose the same acute angle of 20° with this plane. Furthermore, the underside of the valve seat block 20 is not planar, but rather the material outlet surface 62 in which the material outlet openings 26 are located is situated on an extension 64 on the underside and is inclined in such a manner that the center axes 60 run perpendicular to it. Furthermore, the valve seats 22 are configured with a chamfer 66 that can have a conical shape. When applying viscous material to a workpiece, the metering valve 10, 110 is moved parallel to the workpiece surface in the direction 68 in which the center axes 60 are angled away relative to the longitudinal axes 58 of the valve needles 24.

It is self-evident that the chamfer 66 can also be present in the case of the valve seat blocks 20 of the first two exemplary embodiments, in each valve seat 22 or on individual valve seats 22, while it is not compulsory in the case of the alternative valve seat block 20 according to FIG. 4. Furthermore, it is self-evident that the metering valves 10, 110 according to the first and second exemplary embodiment can be equipped not only with a valve seat block 20 as shown in FIG. 1 to FIG. 3 but also with an alternative valve seat block 20 according to FIG. 4.

In summary, the following should be stated:

The invention particularly relates to a metering valve 10, 110 for viscous materials, having a housing 12, having a material channel 16 that runs in the housing 12 and ends in multiple material outlet openings 26, and having a number of valve needles 24 displaceably mounted in the housing 12, which number corresponds to the number of material outlet openings 26, wherein each valve needle 24 has a valve seat 22 assigned to it, and wherein each valve needle 24 can be moved between a closed position in which it sits on the valve seat 22 assigned to it and closes off one of the material outlet openings 26, and an open position in which the material outlet opening 26 in question is exposed. According to the invention, it is provided that the valve needles 24 are produced from carbide and are passed through feed-through openings 30 in a guide block 28 arranged at a distance from the valve seats 22, in longitudinally displaceable manner, wherein the guide block 28 is produced from carbide, at least on the inner surfaces of the feed-through openings 30 that face the valve needles 24.

The invention claimed is:

1. A metering valve for viscous materials, having a housing (12), having a material channel (16) that runs in the housing (12) and ends in multiple material outlet openings (26), and having a number of valve needles (24) displaceably mounted in the housing (12), which number corresponds to the number of material outlet openings (26), wherein each valve needle (24) has a valve seat (22) assigned to it, wherein each valve needle has a first end section having a first end facing away from the valve seat assigned to it, a second end section having a second end facing the valve seat assigned to it, and a valve needle body extending between the first end section and the second end section, wherein each valve needle (24) is movable between a closed position in which the needle valve sits on the valve seat (22) assigned to the needle valve and closes off one of the material outlet openings (26), and an open position in which the material outlet opening (26) in question is exposed, wherein the valve needles (24) are produced from carbide and are passed through feed-through openings (30) in a guide block (28) arranged at a distance from the valve seats (22), in longitudinally displaceable manner, wherein each valve needle body passing through the feed-through opening in the guide block has a constant diameter from the feed-through opening up to the second end section, wherein the feed-through openings (30) have inner surfaces that lie against the valve needles (24), forming a seal, wherein the feed-through openings (30) have dimensions adapted to dimensions of the valve needles (24) to guide the valve needles (24) in the guide block (28) and achieve a sealing effect between the guide block (28) and the valve needles (24) to prevent exiting of the viscous materials in a direction away from the material outlet openings (26), wherein the guide block (28) is produced from carbide, at least on the inner surfaces of the feed-through openings (30) that face the valve needles (24), and wherein the carbide comprises a metal matrix composite material in which hard substances present in particle form are held together by a matrix composed of metal.

2. The metering valve according to claim 1, wherein the guide block (28) is produced from carbide, in one piece.

3. The metering valve according to claim 1, wherein each valve seat (22) is produced from carbide.

4. The metering valve according to claim 3, wherein the valve seats (22) are arranged on a valve seat block (20) that is produced from carbide, in one piece.

5. The metering valve according to claim 1, wherein the housing (12) has an in-feed part (14) through which the material channel (16) runs from a material inlet opening (18) all the way to the valve seats (22), and wherein the guide block (28) is accommodated in the in-feed part (14).

6. The metering valve according to claim 5, wherein a flushing chamber (34) for accommodation of a fluid is arranged in the housing (12) on the rear (32) of the guide block (28), facing away from the valve seats (22).

7. The metering valve according to claim 6, wherein the housing (12) has a feed line (38) and a drain line (40) for passing fluid through the flushing chamber (34).

8. The metering valve according to claim 6 wherein the housing (12) has a closure part (36) connected with the in-feed part (14), having or covering the flushing chamber (34).

9. The metering valve according to claim 1, wherein the housing (12) is configured in multiple parts, with multiple housing parts (14, 20, 28, 36), at least two of which are releasably connected with one another, and wherein one of the housing parts releasably connected with one another is the guide block (28) and/or the valve seat block (20) and/or the in-feed part (14) and/or the closure part (36).

10. The metering valve according to claim 1, wherein the material outlet openings (26) and the valve needles (24) are arranged in at least one row, in each instance.

11. The metering valve according to claim 1, further comprising an actuator unit having at least one actuator to impact the at least one valve needle (24).

12. The metering valve according to claim 11, wherein each valve needle (24) is accommodated, with the first end (46) of the valve needle (24) facing away from the related valve seat (22), in a sleeve (48) composed of metal and connected with the sleeve, and wherein each sleeve (48) is impacted by the actuator unit.

13. The metering valve according to claim 12, wherein a solid-body joint is arranged between each sleeve (48) and the actuator unit.

14. The metering valve according to claim 1, wherein a material outflow channel that communicates with the material channel (16) runs in the housing (12) to a material outflow opening.

15. The metering valve according to claim 1, wherein each valve needle (24) is movable between the closed position and the open position, along a longitudinal axis (58) of the valve needle (24), and wherein a material outlet channel (56) extends between each of the valve seats (22) and the related material outlet opening (26), the center axis (60) of which channel is angled away at an acute angle (a) with reference to the longitudinal axis (58) of the related valve needle (24).

16. The metering valve according to claim 15, wherein the center axes (60) of all the material outlet channels (56) run parallel to one another.

17. The metering valve according to claim 15, wherein the center axes (60) of all the material outlet channels (56) run transverse to a plane spanned by the longitudinal axes (58) of the valve needles (24).

18. The metering valve according to claim 15, wherein the material outlet openings (26) are arranged in a material outlet surface (62) and wherein the center axes (60) of the material outlet channels (56) run perpendicular to the material outlet surface (62).

19. A method for applying a viscous material to a workpiece, wherein the metering valve (10, 110) according to claim 15 is moved relative to the workpiece, in a direction in which the center axis (60) is angled away relative to the longitudinal axis (58) of the related valve needle (24), in each instance.

* * * * *